(12) United States Patent
Evertt et al.

(10) Patent No.: US 9,013,489 B2
(45) Date of Patent: Apr. 21, 2015

(54) GENERATION OF AVATAR REFLECTING PLAYER APPEARANCE

(75) Inventors: Jeffrey Jesus Evertt, Kirkland, WA (US); Justin Avram Clark, Kirkland, WA (US); Zachary Tyler Middleton, Seattle, WA (US); Matthew J Puls, Redmond, WA (US); Mark Thomas Mihelich, Seattle, WA (US); Dan Osborn, Redmond, WA (US); Andrew R Campbell, Kirkland, WA (US); Charles Everett Martin, Redmond, WA (US); David M Hill, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 13/297,890

(22) Filed: Nov. 16, 2011

(65) Prior Publication Data

US 2012/0309520 A1 Dec. 6, 2012

Related U.S. Application Data

(60) Provisional application No. 61/493,839, filed on Jun. 6, 2011.

(51) Int. Cl.
*G06T 13/00* (2011.01)
*A63F 13/40* (2014.01)
(Continued)

(52) U.S. Cl.
CPC ............... *A63F 13/10* (2013.01); *G06T 19/20* (2013.01); *A63F 2300/1093* (2013.01); *A63F 2300/5553* (2013.01); *G06T 2200/08* (2013.01); *G06K 9/00281* (2013.01)

(58) Field of Classification Search
CPC .............................. G06T 13/40; G06T 13/00
USPC .................................. 345/473, 418
See application file for complete search history.

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 101254344 B | 6/2010 |
| EP | 0583061 A2 | 2/1994 |

(Continued)

OTHER PUBLICATIONS

PCT Notification of Transmittal of the International Search Report and the Written Opinion of the International Searching Authority, or the Declaration, mailed Nov. 28, 2012, 10 pages.

(Continued)

*Primary Examiner* — Devona Faulk
*Assistant Examiner* — Jin Ge
(74) *Attorney, Agent, or Firm* — Leonard Smith; Aaron Chatterjee; Micky Minhas

(57) ABSTRACT

Systems, methods, and computer media for generating an avatar reflecting a player's current appearance. Data describing the player's current appearance is received. The data includes a visible spectrum image of the player, a depth image including both the player and a current background, and skeletal data for the player. The skeletal data indicates an outline of the player's skeleton. Based at least in part on the received data, one or more of the following are captured: a facial appearance of the player; a hair appearance of the player; a clothing appearance of the player; and a skin color of the player. A 3D avatar resembling the player is generated by combining the captured facial appearance, hair appearance, clothing appearance, and/or skin color with predetermined avatar features.

19 Claims, 9 Drawing Sheets

(51) Int. Cl.
*G06T 19/20* (2011.01)
*G06T 17/00* (2006.01)
*G06K 9/00* (2006.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/200 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,543,052 B1 | 4/2003 | Ogasawara |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |

(56) References Cited

U.S. PATENT DOCUMENTS

| | | | |
|---|---|---|---|
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,406,482 B1 * | 3/2013 | Chien et al. | 382/118 |
| 2001/0033675 A1 | 10/2001 | Maurer et al. | |
| 2003/0053686 A1 * | 3/2003 | Luo et al. | 382/165 |
| 2003/0206645 A1 * | 11/2003 | Okazaki et al. | 382/117 |
| 2003/0215115 A1 * | 11/2003 | Kim et al. | 382/118 |
| 2005/0063582 A1 * | 3/2005 | Park et al. | 382/154 |
| 2005/0162419 A1 * | 7/2005 | Kim et al. | 345/419 |
| 2007/0132780 A1 | 6/2007 | Garbow et al. | |
| 2007/0273711 A1 * | 11/2007 | Maffei | 345/630 |
| 2008/0026838 A1 | 1/2008 | Dunstan et al. | |
| 2008/0225041 A1 | 9/2008 | El Dokor et al. | |
| 2009/0044113 A1 | 2/2009 | Jones et al. | |
| 2009/0202114 A1 * | 8/2009 | Morin et al. | 382/118 |
| 2010/0135597 A1 * | 6/2010 | Gokturk et al. | 382/305 |
| 2010/0220933 A1 | 9/2010 | Takano et al. | |
| 2010/0290677 A1 * | 11/2010 | Kwan | 382/118 |
| 2010/0302138 A1 | 12/2010 | Poot et al. | |
| 2010/0302247 A1 | 12/2010 | Perez et al. | |
| 2011/0007142 A1 | 1/2011 | Perez et al. | |
| 2011/0025689 A1 * | 2/2011 | Perez et al. | 345/420 |
| 2011/0057954 A1 | 3/2011 | Kobayashi et al. | |
| 2011/0194762 A1 * | 8/2011 | Haibing | 382/165 |
| 2011/0299776 A1 * | 12/2011 | Lee et al. | 382/173 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Kasap, et al., "Virtual Face Implant for Visual Character Variations", In Proceeding of 12th International Workshop on Image Analysis for Multimedia Interactive Services, Apr. 13, 2011, 4 pages.

"Supplementary Search Report Received for European Patent Application No. 12797041.6", Mailed date: Oct. 31, 2014, 3 Pages.

"Office Action Received for European Patent Application No. 12797041.6", Mailed date: Dec. 16, 2014, 6 Pages.

* cited by examiner

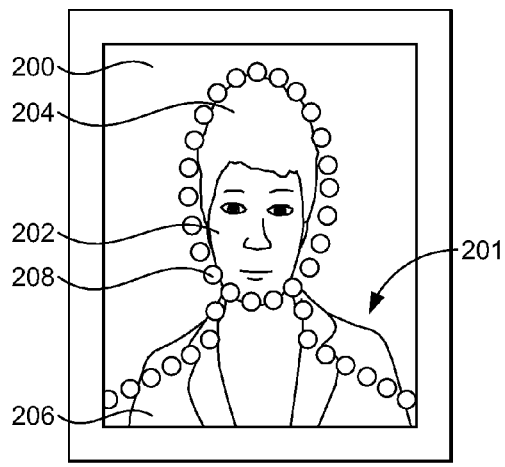
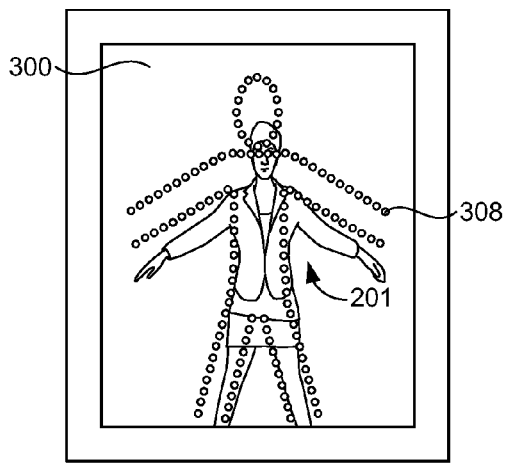
FIG. 2  FIG. 3
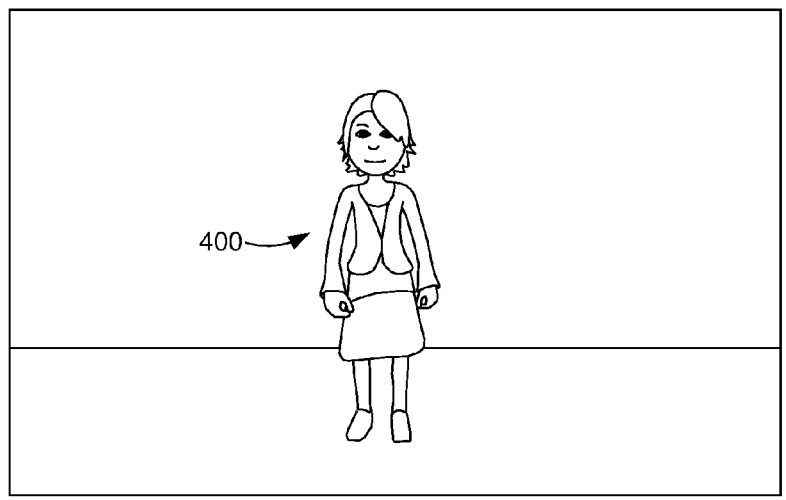
FIG. 4

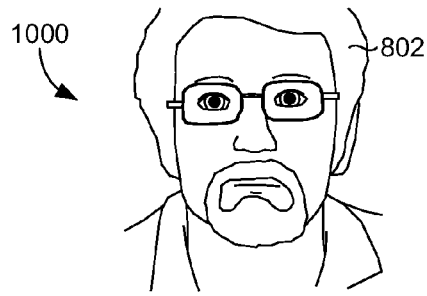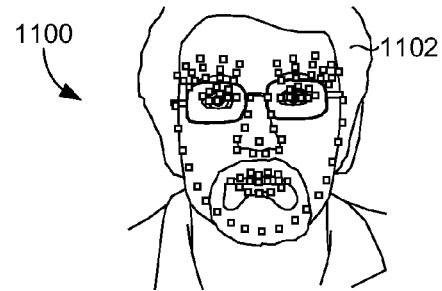
FIG. 10    FIG. 11
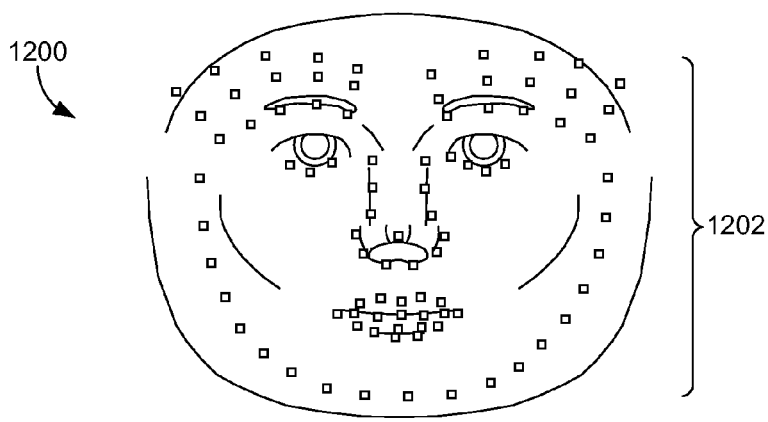
FIG. 12
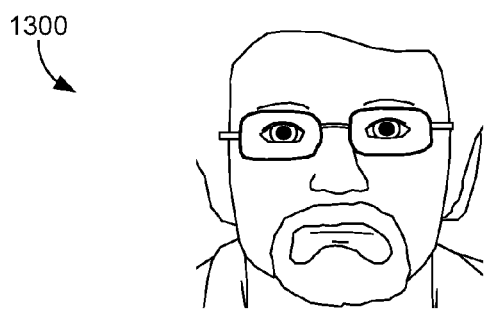
FIG. 13

GENERATION OF AVATAR REFLECTING PLAYER APPEARANCE

CROSS-REFERENCE TO RELATED APPLICATIONS

This application claims priority to U.S. provisional application 61/493,839, filed Jun. 6, 2011 and titled "Generation of Avatar Reflecting Player Appearance," the disclosure of which is hereby incorporated herein in its entirety by reference.

BACKGROUND

Video games have advanced substantially in recent years. Improvements in processing power, image processing, and graphics, among other areas, have enabled games of increasing conceptual and graphical complexity. Conventionally, players selected a default character or selected one of a group of simple, predefined characters. As video games have evolved, the use of player avatars rather than simple characters has become increasingly common. Some games allow a player to select among a group of predefined avatars or customize various features of an avatar. Players can attempt to create an avatar resembling themselves by manually customizing features such as hair color, gender, height, glasses, etc. Such manual customization is time consuming and still does not result in an avatar that actually resembles the appearance of the player.

SUMMARY

Embodiments of the present invention relate to systems, methods, and computer media for generating an avatar reflecting a player's current appearance. Data describing the player's current appearance is received. The data includes a visible spectrum image of the player, a depth image including both the player and a current background, and skeletal data for the player. The skeletal data indicates an outline of the player's skeleton. Based at least in part on the received data, one or more of the following are captured: a facial appearance of the player; a hair appearance of the player; a clothing appearance of the player; and a skin color of the player. A shirt sleeve, pants or shorts leg, or skirt or dress hem may also be detected. A 3D avatar resembling the player is generated by combining the captured facial appearance, hair appearance, clothing appearance, skin color, and/or detected shirt sleeve, pants or shorts leg, or skirt or dress hem with predetermined avatar features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein:

FIG. 2 is a perspective view of a visible spectrum image of a player's head in accordance with embodiments of the present invention;

FIG. 3 is a perspective view of a visible spectrum image of a player in accordance with embodiments of the present invention;

FIG. 4 is a perspective view of a 3D avatar resembling the player in FIGS. 2 and 3 in accordance with embodiments of the present invention;

FIG. 10 is a partial perspective view of a visible spectrum image of a player's head in accordance with embodiments of the present invention, the image showing the face and other portions of the head;

FIG. 11 the image of FIG. 10 shown with alignment points in accordance with embodiments of the present invention;

FIG. 12 is a template texture map with destination points in accordance with embodiments of the present invention;

FIG. 13 is a face texture map resulting from warping the image in FIG. 11 by matching the alignment points to the destination points in FIG. 12;

DETAILED DESCRIPTION

Figure 1:
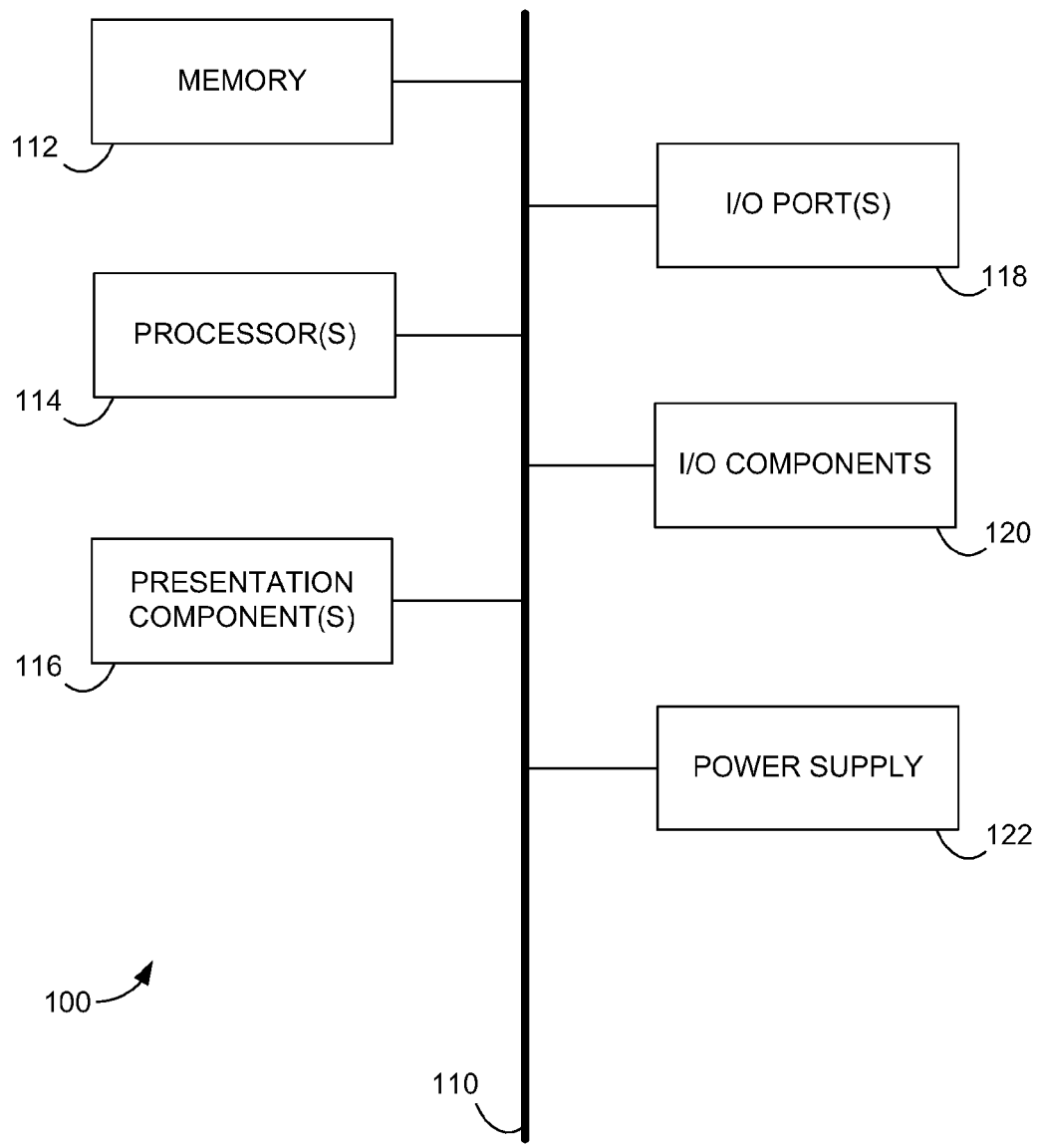
FIG. 1 is a block diagram of an exemplary computing environment suitable for use in implementing embodiments of the present invention.

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer media for generating an avatar reflecting a player's current appearance. In accordance with embodiments of the present invention, an avatar is generated from data describing the player's current appearance. Various aspects of the player's appearance are captured based on the data and combined with predetermined avatar features to generate a 3D avatar resembling the player.

As discussed above, players can attempt to create an avatar resembling themselves by manually customizing certain features, but the resulting avatar still does not actually reflect the appearance of the player.

Various sensors can be used, however, to gather data describing a player's current appearance. These sensors provide visible spectrum images, depth images, and skeletal data, among other data, that contain detailed information describing the player's appearance and can be used to generate an avatar that accurately reflects the player's appearance. The combination of visible spectrum data, depth data, and skeletal data allows capture of detailed aspects of a player's appearance not previously possible. Additionally, an avatar resembling the player can be automatically generated without player selection of various features after sensor data is acquired.

In one embodiment of the present invention, data describing the player's current appearance is received. The data includes: a visible spectrum image of the player, a depth image including both the player and a current background, and skeletal data for the player. The skeletal data indicates an outline of the player's skeleton. A facial appearance of the player is captured based at least in part on the received data. The facial appearance is captured by identifying the player's face; identifying facial features of the player's face; and warping a portion of the received visible spectrum image that includes the player's face into a face texture map based on the identified facial features. A hair appearance of the player is captured based at least in part on the received data. The hair appearance is captured by identifying an extent of the player's hair; matching the identified extent of the player's hair to a predetermined hairstyle template; and identifying a color of the player's hair. A 3D avatar reflecting the captured facial appearance and hair appearance of the player is generated such that the 3D avatar resembles the player. The 3D avatar is generated by combining the face texture map, hairstyle template that matches the identified extent of the player's hair, and the identified player hair color with predetermined avatar features.

In another embodiment, a data acquisition component receives data describing the player's current appearance. The data includes: a visible spectrum image of the player, a depth image including both the player and a current background, and skeletal data for the player. The skeletal data indicates an outline of the player's skeleton. A face capture component captures a facial appearance of the player based at least in part on the received data. A hair capture component captures a hair appearance of the player based at least in part on the received data. A clothing capture component captures a clothing appearance of the player based at least in part on the received data. An avatar generation component generates a 3D avatar resembling the player by combining the captured facial appearance, hair appearance, and clothing appearance with predetermined avatar features.

In still another embodiment, data describing the player's current appearance is received. The data includes: a visible spectrum image of the player, a depth image including both the player and a current background, and skeletal data for the player. The skeletal data indicates an outline of the player's skeleton. A facial appearance of the player is captured based at least in part on the received data. The facial appearance is captured by identifying the player's face; identifying facial features of the player's face; and warping a portion of the received visible spectrum image that includes the player's face into a face texture map based on the identified facial features. A hair appearance of the player is captured based at least in part on the received data. The hair appearance is captured by identifying an extent of the player's hair; matching the identified extent of the player's hair to a predetermined hairstyle template; and identifying a color of the player's hair.

A clothing appearance of the player is captured based at least in part on the received data. The clothing appearance is captured, using the received depth image including both the player and the current background and the received visible spectrum image of the player, by determining an outer clothing boundary using edge detection. The clothing appearance is also captured by, using the received visible spectrum image of the player, determining at least one inner clothing boundary by distinguishing clothing from skin based on a determined color gradient. The clothing appearance is further captured by identifying player clothing as the area bounded at least in part by the outer clothing boundary and the at least one inner clothing boundary.

A skin color of the player is captured based at least in part on the received data. The skin color is captured by sampling the color of one or more areas of the received visible spectrum image in areas corresponding to the player's face and blending the sampled colors of the one or more areas to determine a player skin color. A processor of a computing device is used to generate a 3D avatar reflecting the captured facial appearance, hair appearance, clothing appearance, and skin color of the player such that the 3D avatar resembles the player. The 3D avatar is generated by combining the face texture map, hairstyle template that matches the identified extent of the player's hair, and identified player hair color with predetermined avatar features.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media typically embodies computer-readable instructions, data structures, program modules, or other data in a modulated data signal such as a carrier wave. The term "modulated data signal" refers to a propagated signal that has one or more of its characteristics set or changed to encode information in the signal. By way of example, and not limitation, communication media includes wired media, such as a wired network or direct-wired connection, and wireless media such as acoustic, RF, infrared, radio, microwave, spread-spectrum, and other wireless media. Combinations of the above are included within the scope of computer-readable media.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention relate to systems, methods, and computer media for generating an avatar resembling a player's current appearance. Embodiments of the present invention will be discussed with reference to FIGS. 2-16.

FIGS. 2-4 illustrate an implementation of an embodiment of the present invention to acquire data describing a player and generate an avatar resembling the player's current appearance. FIG. 2 illustrates a visible spectrum image 200 of player 201. Image 200 includes face 202, hair 204, and clothes 206 of player 201. In one embodiment, player 200 positions herself in front of a camera according to guide markers 208 to facilitate capture of image 201. FIG. 3 illustrates another visible spectrum image 300 of player 201. Substantially all of the body of player 201 is included in image 300. FIG. 3 also includes guide markers 308 to facilitate capture of image 308.

In addition to visible spectrum images 200 and 300, sensors gather one or more depth images of player 201. A depth image indicates the depth of each pixel in the image, which allows the background of an image to be distinguished from a person or object in the image and also allows identification of various body features of a person, such as facial features, based on the depth. The person can be recognized as including the pixels that are of a similar depth in the foreground of the image, whereas the background is determined to be the pixels having a larger depth.

Depth data also allows creation of skeletal data as known in the art. In one embodiment, the portion of an image representing a person can be distinguished from the background of the image using depth information. The portion of the image representing the person can then be compared to a database of poses to identify a match to the pose of the identified person. Once a match is identified, a simplified skeletal structure corresponding to the match can be identified. The simplified skeletal structure can indicate the outline of a player's skeleton and can include points that represent joints and lines connecting the points to represent appendages or other body features. Other methods for identifying a simplified player skeleton from depth data are also envisioned.

Visible spectrum images 200 and 300, along with skeletal data and a depth image, are combined with predetermined avatar features to generate an avatar 400 shown in FIG. 4 resembling player 201. In some embodiments, the generated avatar has certain predetermined proportions, such as height and width, and certain predetermined features such as hands, feet, eyes, arm and leg width, or other features. Avatar 400 reflects face 202, hair 204, and clothes 206 of player 201, achieving an avatar that much more accurately represents player 201 that manual selection of various features can accomplish.

Figure 5:
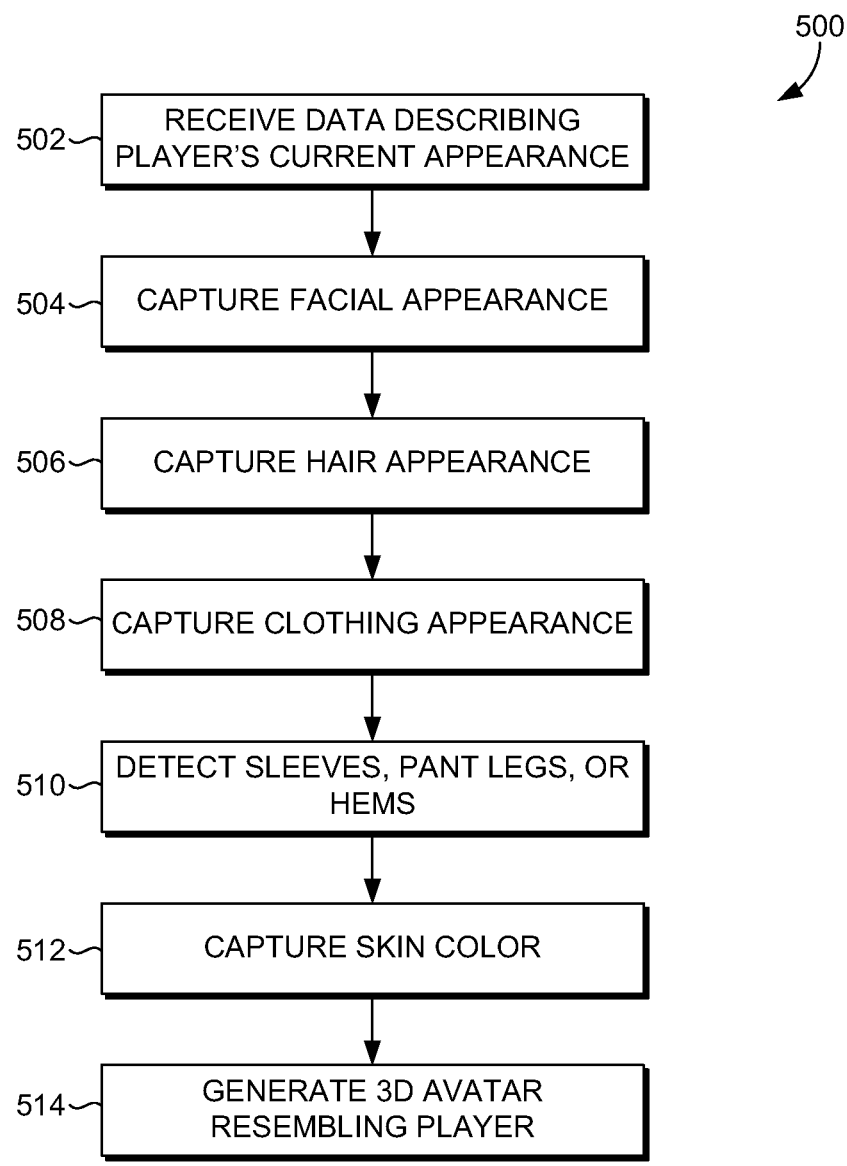
FIG. 5 is a flow chart of an exemplary method for generating an avatar reflecting a player's current appearance in accordance with an embodiment of the present invention.

FIG. 5 illustrates a method of generating an avatar reflecting a player's current appearance. In step 502, data describing the player's current appearance is received. The data includes: a visible spectrum image of the player, a depth image including both the player and a current background, and skeletal data for the player. The skeletal data indicates an outline of the player's skeleton. In step 504, a facial appearance of the player is captured based at least in part on the received data. Also based at least in part on the received data: a hair appearance and clothing appearance are captured in steps 506 and 508; sleeves, pant legs, or hems are detected in step 510; and skin color is captured in step 512. In step 514, a 3D avatar resembling the player is generated by combining the captured facial appearance, hair appearance, clothing appearance, sleeves/legs/hems, and skin color with predetermined avatar features.

Figure 6:
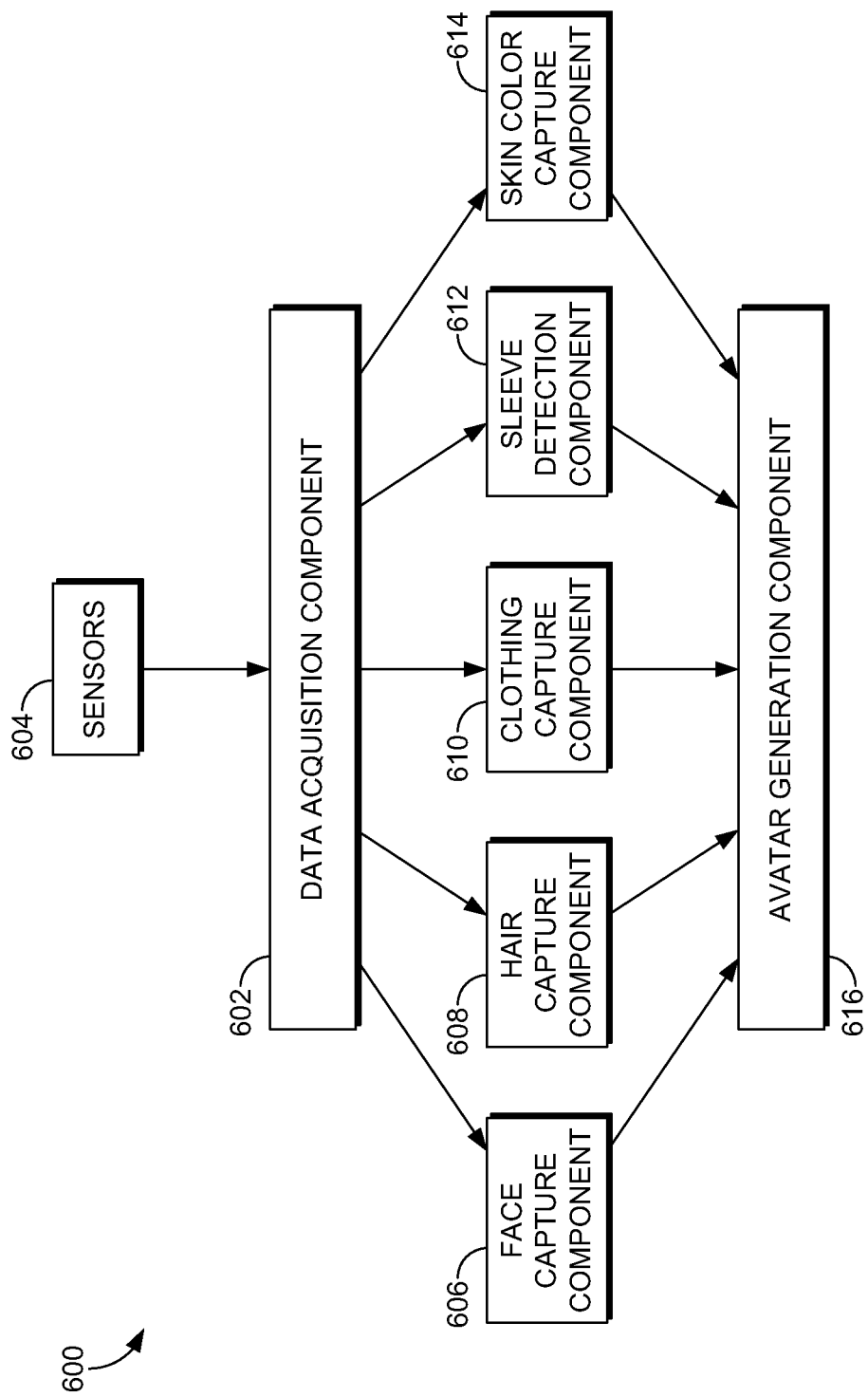
FIG. 6 is an exemplary avatar generation system in accordance with an embodiment of the present invention.

FIG. 6 illustrates a system 600 in accordance with an embodiment of the present invention. Data acquisition component 602 receives data describing the player's current appearance from sensors 604. The data includes: a visible spectrum image of the player, a depth image including both the player and a current background, and skeletal data for the player. The skeletal data indicates an outline of the player's skeleton. Sensors 604 may include an RGB camera and an infrared or other depth sensor. In one embodiment, a player stands in the path of sensors 604 in a variety of preferred positions to facilitate acquisition of sensor data. Data acquisition component 602 provides received data to face capture component 606, hair capture component 608, clothing capture component 610, sleeve detection component 612, and skin color capture component 614. Components 606, 608, 610, 612, and 614 capture or detect information and provide this information to avatar generation component 616, which generates a 3D avatar resembling the player using the information.

In various embodiments, any combination of components 606, 608, 610, 612, and 614 are included. Face capture component 606 captures a facial appearance of the player based at least in part on the received data. Hair capture component 608 captures a hair appearance of the player based at least in part on the received data. Clothing capture component 610 captures a clothing appearance of the player based at least in part on the received data. Sleeve detection component 612 identifies, based at least in part on the received data, at least one of: (1) a shirt sleeve, (2) a pants or shorts leg, and (3) a skirt or dress hem. Skin color capture component 614 identifies a skin color of the player based at least in part on the received data. Avatar generation component 616 generates a 3D avatar resembling the player by combining the captured facial appearance, hair appearance, and clothing appearance with predetermined avatar features. It is envisioned that the functionality of components 602, 606, 608, 610, 612, 614, and 616 may reside on separate physical components or devices or may be implemented together.

Figure 7:
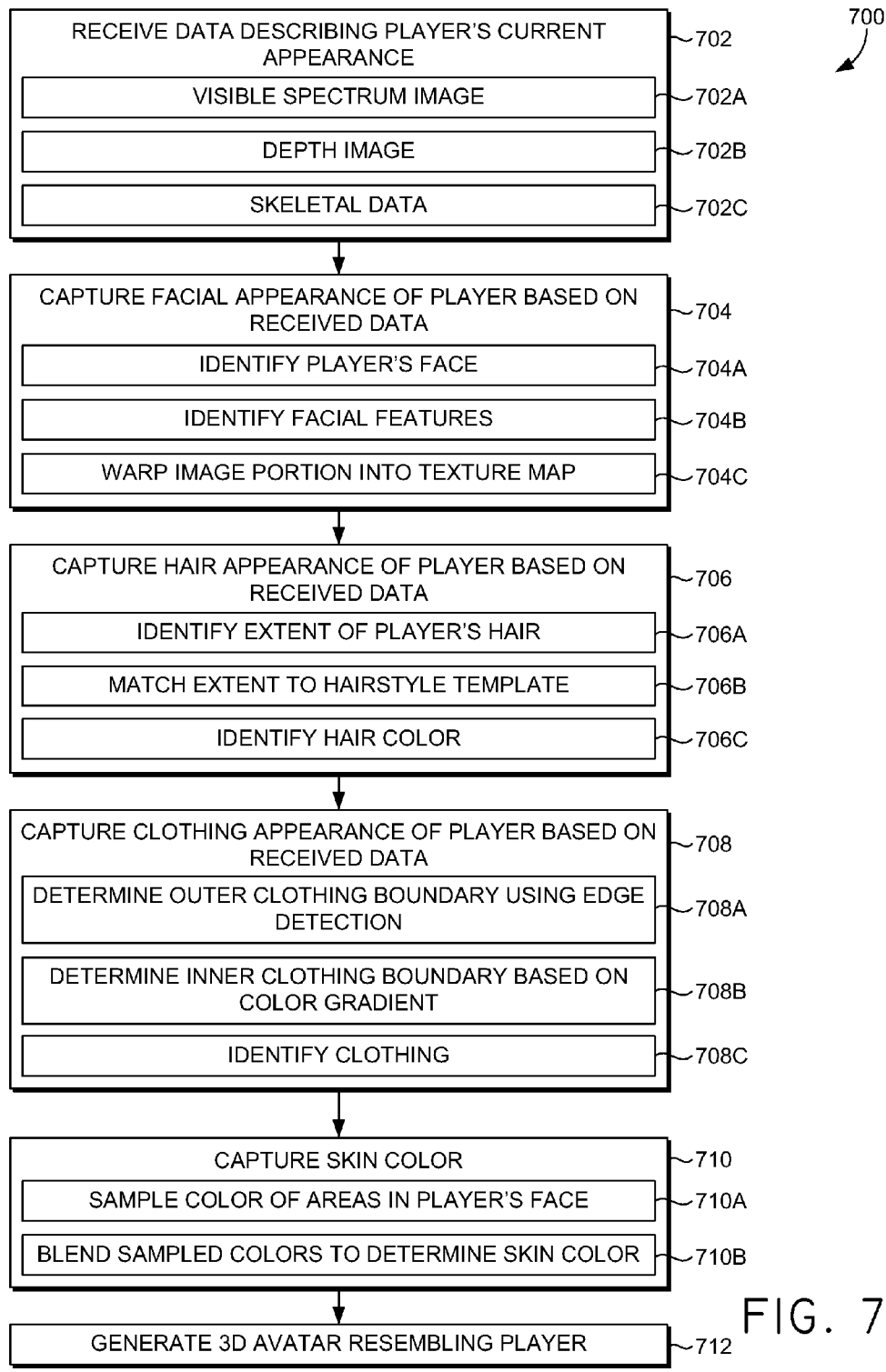
FIG. 7 is a flow chart of an exemplary method for generating an avatar reflecting a player's current appearance in accordance with an embodiment of the present invention in which sub-steps are shown for facial appearance capture, hair appearance capture, clothing capture, and skin color capture.

FIG. 7 illustrates a method 700 of generating an avatar reflecting a player's current appearance. The steps of method 700 may be implemented by the components of system 600 of FIG. 6. In step 702, data describing a player's current appearance is received. This data includes at least one visible spectrum image 702A of the player, at least one depth image 702B including both the player and a current background, and skeletal data 702C for the player. Skeletal data 702C indicates an outline of the player's skeleton and may be derived from the at least one depth image 702B.

In step 704, a facial appearance of the player is captured based at least in part on the received data. Step 704 can be implemented by sub-steps 704A-704C. In sub-step 704A, the player's face is identified. In sub-step 704B, facial features of the player's face are identified. In sub-step 704C, a portion of the received visible spectrum image that includes the player's face is warped into a face texture map based on the identified facial features. The face texture map is a UV space map that identifies how to map 2D image points to a 3D model.

In step 706, a hair appearance of the player is captured based at least in part on the received data. Step 706 can be implemented by sub-steps 706A-706C. In sub-step 706A, the extent of the player's hair is identified. In sub-step 706B, the identified extent of the player's hair is matched to a predetermined hairstyle template. In sub-step 706C, a color of the player's hair is identified.

In step 708, a clothing appearance of the player is captured based at least in part on the received data. Step 708 can be implemented by sub-steps 708A-708C. In sub-step 708A, using the received depth image including both the player and the current background and the received visible spectrum image of the player, an outer clothing boundary is determined using edge detection. In sub-step 708B, using the received visible spectrum image of the player, at least one inner clothing boundary is determined by distinguishing clothing from skin based on a determined color gradient. In sub-step 708C, player clothing is identified as the area bounded at least in part by the outer clothing boundary and the at least one inner clothing boundary.

A skin color of the player is captured in step 710, the capture based at least in part on the received data. Step 710 can be implemented by sub-steps 710A-710B. In sub-step 710A, the color of one or more areas of the received visible spectrum image are sampled in areas corresponding to the player's face. In sub-step 710B, the sampled colors of the one or more areas are blended to determine a player skin color.

In step 712, a 3D avatar is generated reflecting the captured facial appearance, hair appearance, clothing appearance, and skin color of the player such that the 3D avatar resembles the player by combining the face texture map, hairstyle template that matches the identified extent of the player's hair, and identified player hair color with predetermined avatar features.

Facial appearance capture, hair appearance capture, clothing appearance capture, and sleeve/leg/hem detection, discussed with reference to FIGS. 5-7 will now be discussed in greater detail.

Facial Appearance Capture

As discussed above, a visible spectrum image, depth image, and skeletal data can be used to capture a player's facial appearance. The captured facial appearance can then be incorporated into a 3D avatar. In one embodiment, a players head can be identified by analyzing the received skeletal data for the player. A head portion of the received visible spectrum image that corresponds to the player's head can then be identified. Thus, a rough location of the player's head and face can first be identified with skeletal data, and the portion of the visible spectrum image corresponding to this location can be analyzed further. In one embodiment, a face detection algorithm is applied to the head portion of the received visible spectrum image. In one particular algorithm, machine learning techniques are used that compare the face to a database of known faces.

From an identified face, a variety of facial features can be identified. In some embodiments, face alignment points corresponding to the identified facial features are determined. The identified face alignment points are matched to destination points on a template texture map. The portion of the received visible spectrum image that includes the player's face is warped into a face texture map such that the face texture map includes the face alignment points corresponding to the identified facial features of the player's face mapped to the destination points of the template texture map. By doing this, an image of a player's face is slightly distorted to fit a destination template. Texture maps as used in this application are in the UV space and contain information allowing them to be mapped to a 3D model. Thus, by identifying facial features and corresponding alignment points and mapping the alignment points to destination points of a template texture map, a 3D model of the player's face can now be created.

Figure 8:
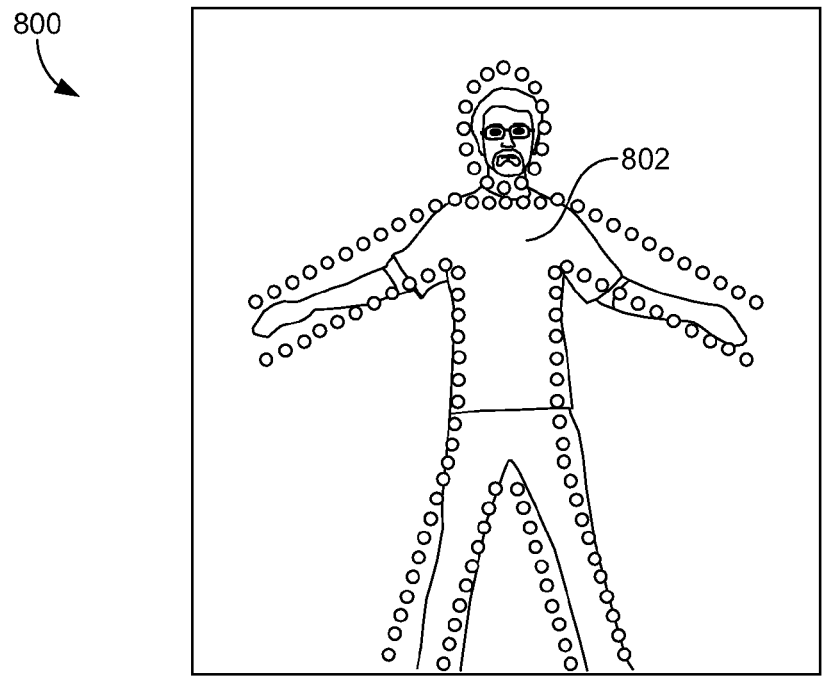
FIG. 8 is a perspective view of a visible spectrum image of a player in accordance with embodiments of the present invention.
Figure 9:
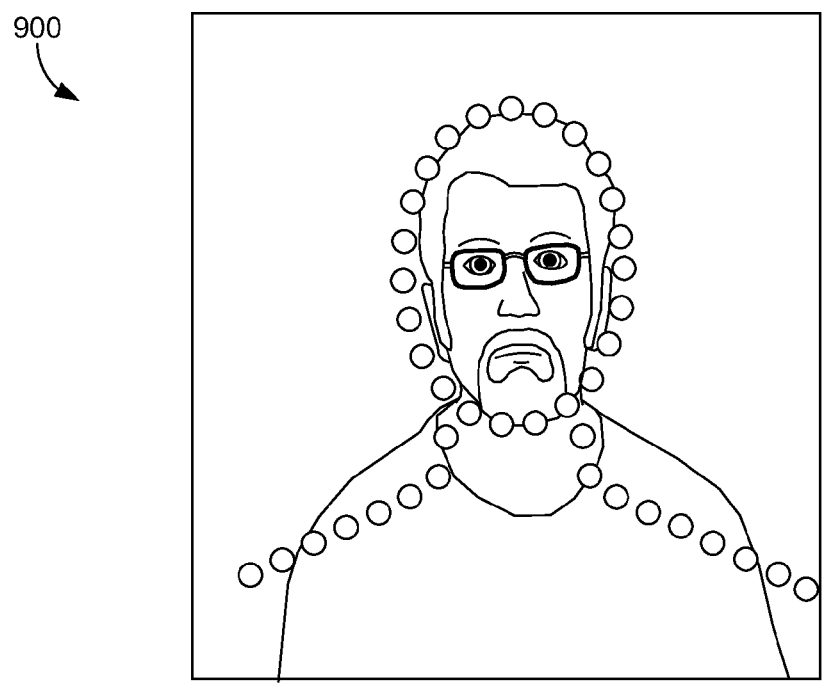
FIG. 9 is a perspective view of a visible spectrum image of a player's head in accordance with embodiments of the present invention.

This is illustrated in FIGS. 8-13. FIG. 8 shows visible spectrum image 800 of player 802. FIG. 9 shows a second visible spectrum image 900 of player 802. The guide markers shown in FIGS. 8 and 9 are shown to facilitate feature detection—if player 802 positions his body in locations the system is expecting, feature detection becomes more accurate. FIG. 10 illustrates the face 1000 of player 802. Face 1000 is shown here along with hair and a portion of the player's clothing. FIG. 11 illustrates exemplary face alignment points 1102 corresponding to identified facial features. Facial features can include the eyes, chin, ears, nose, mouth, eyebrows, jaw, and other features. In one embodiment, 99 face alignment points are used as follows: 0-7 left eye, 8-15 right eye, 16-25 left eyebrow, 26-35 right eyebrow, 36-47 nose, 48-59 outer mouth, 60-67 inner mouth, 68-86 jaw line, 87 left eye center, 88 right eye center, 89 nose center, and 90-99 above eyebrows.

Figure 14:
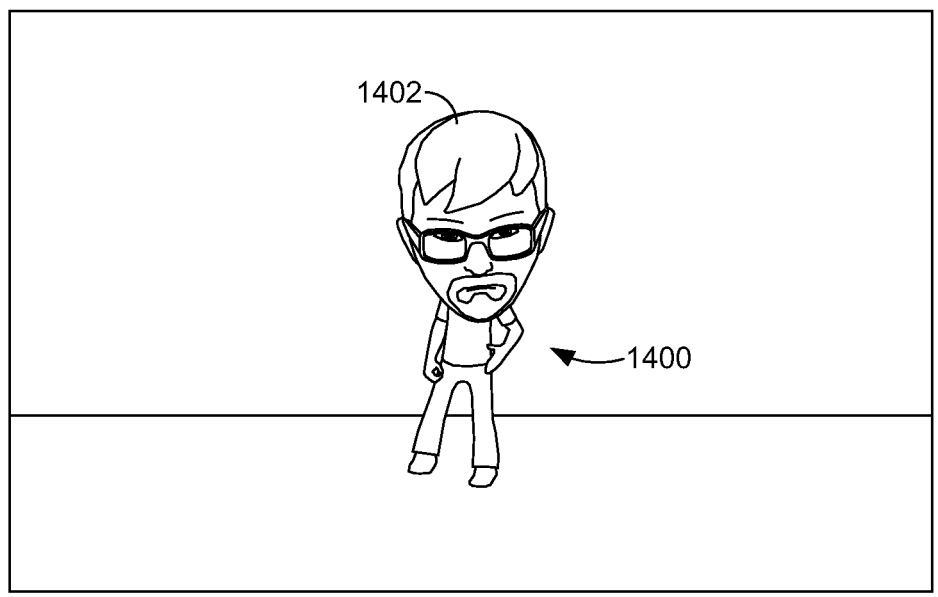
FIG. 14 is a 3D avatar reflecting the current appearance of the player in the image in FIGS. 8-11 and 13.

FIG. 12 illustrates a template texture map 1200 that defines a relationship between the destination points 1202 and a 3D model. Texture maps in the UV space are well known in the art. Face alignment points 1102 serve as source points to destination points 1202. Template texture map 1200 may be an artist-created map to map to a particular stylized 3D head model. Various template texture maps may be used. In some embodiments, not all alignment points need to be aligned with destination points. For example, eye and mouth alignment points may not be matched to better preserve a player's expression. FIG. 13 illustrates the resulting face texture map 1300. Face texture map 1300 is distorted slightly as compared to image 1000 of FIG. 10. Face texture map 1300 can be morphed into a 3D head model based representing player 802's head that is included as part of a 3D avatar reflecting player 802's current appearance. FIG. 14 illustrates avatar 1400 having a face and head 1402 resembling player 802.

In some embodiments, data describing the player's current appearance is only received for the front of the player. Data for the sides and back of the player is inferred. In other embodiments, images of the player from multiple angles or sides are received, and feature recognition is performed for each side of a player's head and body.

Various filtering and processing steps may also be undertaken. In one embodiment, the following filters and values are applied: bilateral filter to an RGB image (kernel radius 3 pixels, edge threshold (0-255) of 20; color noise reduction (bilateral filter, HSV color space), kernel radius 5 pixels, edge threshold (0-255) of 42; auto-contrast (HSV space), re-center value (0-1) of 0.54, re-Standard Deviation value (0-1) of 0.15, and blend with original (0-1) of 0.5; adjust brightness curve (HSV space), curve point 1 of 0.6, 1.0, blend with original (0-1) of 0.5.

In some embodiments, prior to morphing the face texture map into a 3D head model, the alignment points are analyzed, and the size of the corresponding facial features are calculated. Based on the face texture map and the calculated size of the plurality of identified facial features, a plurality of predetermined head models are combined to create a morphed 3D head model.

In one embodiment, the measurements are normalized to consider the actual size of the player's head in the visible spectrum image to account for the image being of a head close up or far away. A morph configuration is then determined for each feature by comparing the normalized values to mean and standard deviation values. This effectively provides information regarding how large/small/wide/narrow, etc a particular feature is as compared to the average. A variety of artist-created 3D head models exist, and appropriate features from various models are combined according to the morph configurations. Thus, normalized face dimensions are converted into morph configurations, and the morph configurations specify how to blend the various head models to reflect the player's features.

In one particular embodiment, morph configurations are categorized as follows: jaw/chin as wide, narrow, long, short; and nose as narrow, wide, short, long; eye region as wide spacing, narrow spacing, placed high or placed low.

Hair Appearance Capture

In addition to capturing a player's face, a player's hair appearance can be captured. Hair appearance includes hair color as well as an approximate hair style. In one embodiment, various aspects of a player's hair such as bangs, amount on top, amount on each side, amount beyond chin, forehead coverage, etc are analyzed and combined to match predefined hairstyle templates.

In one embodiment, the extent of the player's hair is identified by determining an inner and outer hair boundary. Using the received depth image including both the player and the current background, an outer hair boundary is determined by distinguishing the depth of the background from the depth of the player's hair. Using the received visible spectrum image of the player, an inner hair boundary is determined by distinguishing the player's skin and/or clothing from the player's hair. In one embodiment, the inner hair boundary is determined by distinguishing the player's hair from clothing worn by the player and by determining the extent of the player's forehead using the facial features identified in capturing the facial appearance of the player. Knowing the location of the player's forehead helps narrow the locations in which to analyze the visible spectrum image for hair.

The player's hair is identified as the area bounded at least in part by the outer and inner hair boundaries. In some embodiments, a plurality of hair attributes of the player's hair are identified, each of the plurality of hair attributes describing a portion or characteristic of the player's hair. Hair attributes include but are not limited to bangs, amount on top, amount on each side, amount beyond chin, forehead coverage, etc. The identified plurality of hair attributes can then be compared to a library of predetermined hairstyle templates to find a best match. In some embodiments, the library contains between 10 and 20 pre-determined hairstyles. In other embodiments, the distance away from the player's head affects how likely a particular pixel is to be classified as hair or not—the closer to the player's head, the more likely the pixel is to be considered hair.

The details of hair appearance capture can be implemented in a variety of ways. Several specific examples of various aspects of hair appearance capture are presented below. Hair can be segmented from a color visible spectrum image using depth-informed background removal, forehead estimation, and face removal. Depth-informed background removal can be accomplished by: deciding on a background threshold (e.g., face distance+20 cm); initializing color image to all-background (tag with special color or alpha); marking as background all depth pixels when they have either value>background or value=0 (depth hole); marking as background all depth pixels whose immediate neighbors were previously marked as background (don't spread from new ones, however)—this erodes depth edges inwards; mapping color pixels to depth pixels; copying all source color pixels which correspond to non-background depth pixels into the target color image; and filling the color image back out along background edges using range-limited flood-fill—for any given non-background color pixel which borders on a background pixel, moving outward away from the edge and copy pixels from the source image to the target image until either a certain distance has been travelled or the source image pixel color deviates too much from the original edge pixel color.

Forehead estimation can be accomplished by: sampling central face color reference using face-detection bounds and seed the color average with this color; sampling across the width of the forehead region starting just above the eyebrows and walk up the forehead, keeping a running average of the color; when one line of sample colors differs significantly from the average, resetting the running average and record a transition point; and stopping walking upwards when only background pixels are sampled and record a transition point.

The first recorded transition point is likely the hairline level, and the last transition point is the top of the hair. Eyebrow level is the bottom of the forehead.

Face removal can be accomplished by: computing a 2D convex hull of face-detection feature points that gives a good outline of the lower face but not the forehead; reflecting some of the jawline points over the line running through the eyes and add those to the convex hull, using the forehead hairline estimate to avoid placing the reflected points above the hairline; marking as background all color pixels within the convex hull; and marking as background all color pixels within the vertical region between the mouth and eyes, excluding the ears.

In another embodiment, hair color is sampled by: constraining sampling to a rectangle around the face, high enough to get tall hair and low enough to get shoulder-length long hair; sampling all color pixels not marked as background for an overall average; and sampling all the non-background color pixels again, excluding any pixels which are significantly different from the average color in custom-scaled HCV color space. If hair style estimation is complete, the color gathered from the sides of the players head can be emphasized over the color gathered from the top, because the sides tend to be less influenced by lighting conditions.

In one embodiment, hairstyle is estimated by dividing the hair sampling area into five regions: top center, upper left/right, and lower left/right. The horizontal threshold between top and upper left/right is at the edge of the eyebrows, and the threshold between upper & lower is the middle of the face (which should be blank from removing the ears). Hair color classification is used to sample the number of hair pixels in each region, and the forehead estimation is used to measure the forehead height and top-hair height. Five values have now been obtained: forehead height, top-hair height, top-hair area, upper-sides area, lower-sides area. The top-hair height and area values can be blended into a single value, resulting in four values. The values are normalized to the estimated face size in pixels based on face detection. Each value can then be classified into bins such as "none", "some", and "lots," where the threshold values are empirically derived through human or machine learning. The binned values are matched against an asset matrix to select a visual hairstyle to display as feedback for a particular player.

Hue-chroma-value (HCV) color space can be used for perceptual color-difference comparisons. This color space is cone-shaped, with black as a single point at the bottom and white as a single point at the top, and saturated colors forming the widest part of the cone at the top. HSV has almost-black colors spread widely across the bottom of a cylinder, which causes problems when image noise can induce wide fluctuations in hue & saturation. The distance between two values is measured using polar coordinate distance on the HC plane and adding Euclidean distance for V. The radius and height of the cone can be scaled to emphasize different characteristics of the color. The color-space distance threshold is another variable to manipulate, but 1 of these 3 variables can be fixed. A different scaling approach holds the top of the cone at a fixed radius of 1 and instead spreads out the bottom point of the cone into a disc by blending chroma and saturation, with a radius of distance threshold/2. This approach guarantees that all dark colors are within the threshold distance of one another without affecting the saturated colors at the top of the pseudo-cone. In one embodiment, specific tuning values for hair include: distance threshold=0.1; H'=H; C'=lerp(S, C, distance threshold/2)[threshold=0 produces pure HCV); and V'=V*0.5.

Clothing Appearance Capture

A clothing appearance can also be captured from the received data describing the player's current appearance. The generated 3D avatar can then include clothing similar to that which the player is wearing.

In one embodiment, the clothing appearance is captured by: using the received depth image including both the player and the current background and the received visible spectrum image of the player, determining an outer clothing boundary using edge detection; using the received visible spectrum image of the player, determining at least one inner clothing boundary by distinguishing clothing from skin based on a color analysis; and identifying player clothing as the area bounded at least in part by the outer clothing boundary and the at least one inner clothing boundary. In another embodiment, the edge detection distinguishes the depth of the background from the depth of the player in the received depth image and distinguishes the color of clothes from the color of the background in the received visible spectrum image.

In some embodiments, body features of the player are identified using the received skeletal data. The outer clothing boundary and the at least one inner clothing boundary are determined by analyzing areas of the received visible spectrum image and areas of the received depth image corresponding to identified body features of the player where clothes are typically worn. For example, wrists, elbows, shoulders, knees, hips, etc can be identified from skeletal data, providing the system a narrowed analysis area for recognizing clothing.

In other embodiments, capturing the clothing appearance of the player further comprises: rescaling the skeletal data for the player to a predetermined skeleton size to form a scaled player skeleton; reposing the scaled player skeleton to a predetermined pose; and creating a clothing texture map based on the reposed, scaled player skeleton and the identified player clothing. A 3D body model generated from the clothing texture map is then used in generating the 3D avatar.

In some embodiments, particular articles of clothing are identified and captured. In other embodiments, and entire body clothing capture is performed. In still other embodiments, when clothing appearance capture is unable to detect particular clothing to a minimum threshold, a short-sleeve shirt and pants or shorts are used as the default. Similarly, if no clothing is detected on the player's torso, a short-sleeve shirt may be included in the avatar.

In one embodiment, skinning of the provided captured depth map positions onto the tracked skeleton is performed. A mesh is then generated. Skin removal is then performed by detecting skin pixels and filling intelligently into areas that may not register as skin but are attached to skin pixels. The background is removed using a Canny edge detect and eroding the player mask by detecting edges in the visible spectrum image close to the edge of the area identified as the player. A bone scale calculation is then performed to try to stretch bones lengthwise and width-wise to fill the mask. The skeletal data is used to repose the skeleton into the provided 2D skeletal positions. The visible spectrum image is then applied onto the mask using the newly retargeted mesh. A per-pixel stretch and/or simple RGB flood fill is used to fill in the remaining white space of the mask.

Sleeve/Leg/Hem Detection

Detection of a shirt sleeve, pants or shorts leg, or skirt or dress hem may be thought of as either separate functionality or as part of clothing appearance capture. In one embodiment, areas corresponding to the arms and legs of the player are identified using the received skeletal data. The color of the received visible spectrum image of the player is then analyzed along the identified areas corresponding to the arms and legs of the player to detect at least one of: (1) a shirt sleeve, (2) a pants or shorts leg, and (3) a skirt or dress hem. The analysis may be, for example, color classification or gradient analysis. In one embodiment, the skeletal data can be used to identify the path along which to analyze the color of the visible spectrum image. For example, because the arm portion of the skeleton is known, the color of pixels can be analyzed moving down the arm from the shoulder to see where a sleeve occurs.

In another embodiment, a skirt or dress hem can be detected. Using the received skeletal data, areas corresponding to the legs of the player are identified. Using the received depth image including both the player and the current background, the area between the identified areas corresponding to the legs of the player is analyzed to detect a skirt or dress edge by distinguishing background depth from player depth and identifying a substantially horizontal edge separating the background depth from the player depth.

Figure 15:
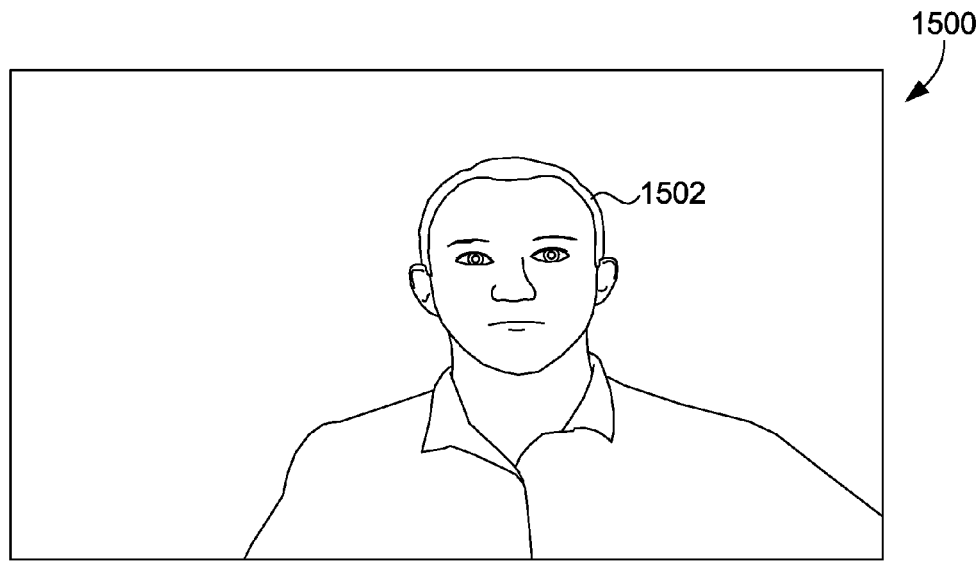
FIG. 15 is a perspective view of a visible spectrum image of a player in accordance with embodiments of the present invention.
Figure 16:
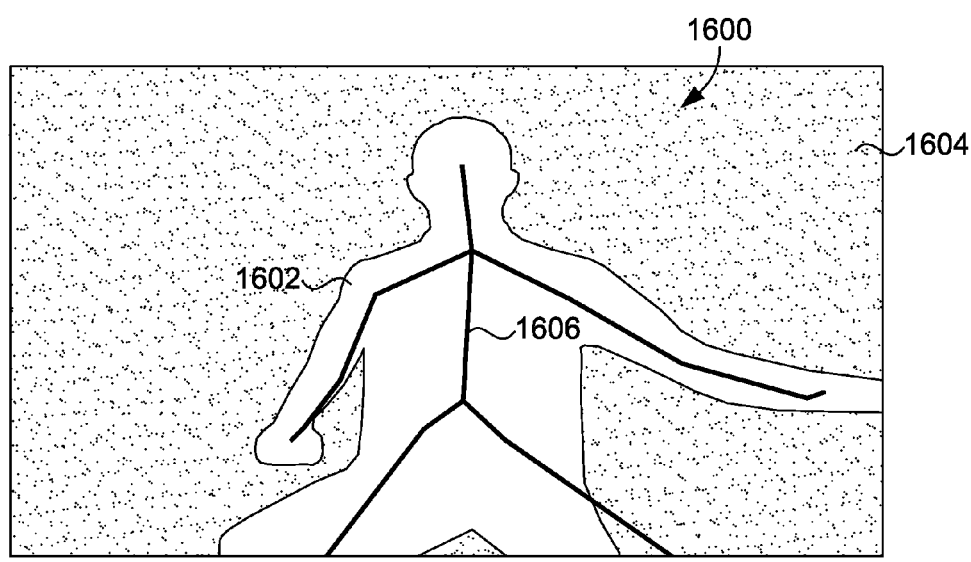
FIG. 16 is a depth image of the player shown in FIG. 15 in which a simplified skeleton has been identified.

Skeletal data has been discussed at various points in the above disclosure. FIG. 15 illustrates a visible spectrum image 1500 of a player 1502, and FIG. 16 illustrates a corresponding depth image 1600 of player 1502. Depth image 1600, which may be produced by an infrared sensor measuring time-of-flight from a sensor, to a sensed object, and back, shows background portion 1604 at a first depth and player portion 1602 at a second depth closer to the front. A simplified skeleton 1606 can be determined based on the pose of player portion 1602. In one embodiment, player portion 1602 is compared to various player poses in a database, and upon identifying a match, skeleton 1606 is determined to be the skeleton of the matching pose in the database.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. Computer hardware devices having embodied thereon computer-executable instructions that, when executed by a computing device, perform a method of generating an avatar reflecting a player's current appearance, the method comprising:
   receiving data describing the player's current appearance, the data including: a visible spectrum image of the player, a depth image including both the player and a current background, and skeletal data for the player, the skeletal data indicating an outline of the player's skeleton;
   capturing a facial appearance of the player based at least in part on the received data by:
      identifying the player's face,
      identifying facial features of the player's face, and
      warping a portion of the received visible spectrum image that includes the player's face into a face texture map based on the identified facial features, wherein the face texture map is a UV space map of the portion of the received visible spectrum image that includes the player's face;
   capturing a hair appearance of the player based at least in part on the received data by:
      identifying an extent of the player's hair,
      matching the identified extent of the player's hair to a predetermined hairstyle template, and
      identifying a color of the player's hair;
   capturing a clothing appearance of the player based at least in part on the received data by:
      using the received depth image including both the player and the current background and the received visible spectrum image of the player, determining an outer clothing boundary using edge detection,
      using the received visible spectrum image of the player, determining at least one inner clothing boundary by distinguishing clothing from skin based on a determined color gradient, and
      identifying player clothing as the area bounded at least in part by the outer clothing boundary and the at least one inner clothing boundary; and
      wherein the generated 3D avatar has clothing resembling the identified player clothing; and
   generating a 3D avatar reflecting the captured facial appearance and hair appearance of the player such that the 3D avatar resembles the player by combining the face texture map, the hairstyle template that matches the identified extent of the player's hair, and the identified player hair color with predetermined avatar features.

2. The devices of claim 1, wherein identifying the player's face comprises:
   identifying the player's head by analyzing the received skeletal data for the player,
   identifying a head portion of the received visible spectrum image that corresponds to the player's head, and
   applying a face detection algorithm to the head portion of the received visible spectrum image.

3. The devices of claim 1, wherein capturing the facial appearance of the player further comprises identifying face alignment points corresponding to the identified facial features, and
   wherein warping a portion of the received visible spectrum image that includes the player's face into the face texture map based on the identified facial features comprises: matching the identified face alignment points to destination points on a template texture map such that the face texture map includes the face alignment points corresponding to the identified facial features of the player's face mapped to the destination points of the template texture map.

4. The devices of claim 3, wherein generating the 3D avatar comprises creating a morphed 3D head model by:
   analyzing the mapped face alignment points of the face texture map,
   for a plurality of the identified facial features corresponding to the mapped face alignment points, calculating the size of the plurality of identified facial features, and
   based on the face texture map and the calculated size of the plurality of identified facial features, combining a plurality of predetermined head models to create the morphed 3D head model.

5. The devices of claim 1, wherein identifying the extent of the player's hair comprises:
   using the received depth image including both the player and the current background, determining an outer hair boundary by distinguishing the depth of the background from the depth of the player's hair, and using the received visible spectrum image of the player, determining an inner hair boundary by distinguishing the player's skin from the player's hair.

6. The devices of claim 5, wherein determining the inner hair boundary comprises:
distinguishing the player's hair from clothing worn by the player, and
using the facial features identified in capturing the facial appearance of the player, determining the extent of the player's forehead.

7. The devices of claim 5, wherein matching the identified extent of the player's hair to a predetermined hairstyle template comprises:
identifying the player's hair as the area bounded at least in part by the outer and inner hair boundaries,
identifying a plurality of hair attributes of the player's hair, each of the plurality of hair attributes describing a portion or characteristic of the player's hair, and
comparing the identified plurality of hair attributes to a library of predetermined hairstyle templates.

8. The devices of claim 1, wherein the edge detection distinguishes the depth of the background from the depth of the player in the received depth image and distinguishes the color of clothes from the color of the background in the received visible spectrum image.

9. The devices of claim 1, wherein capturing the clothing appearance of the player further comprises:
using the received skeletal data, identifying body features of the player, and
determining the outer clothing boundary and the at least one inner clothing boundary by analyzing areas of the received visible spectrum image and areas of the received depth image corresponding to identified body features of the player where clothes are typically worn.

10. The devices of claim 1, wherein capturing the clothing appearance of the player further comprises:
rescaling the skeletal data for the player to a predetermined skeleton size to form a scaled player skeleton,
reposing the scaled player skeleton to a predetermined pose, and
creating a clothing texture map based on the reposed, scaled player skeleton and the identified player clothing; and
wherein a 3D body model generated from the clothing texture map is used in generating the 3D avatar.

11. The devices of claim 1, wherein capturing the clothing appearance of the player further comprises:
using the received skeletal data, identifying areas corresponding to the arms and legs of the player, and
analyzing the color of the received visible spectrum image of the player along the identified areas corresponding to the arms and legs of the player to detect at least one of: (1) a shirt sleeve, (2) a pants or shorts leg, and (3) a skirt or dress hem.

12. The devices of claim 1, wherein capturing the clothing appearance of the player further comprises:
using the received skeletal data, identifying areas corresponding to the legs of the player, and
using the received depth image including both the player and the current background, analyzing the area between the identified areas corresponding to the legs of the player to detect a skirt or dress edge by distinguishing background depth from player depth and identifying a substantially horizontal edge separating the background depth from the player depth.

13. The devices of claim 1, further comprising capturing a skin color of the player based at least in part on the received data by:
sampling the color of one or more areas of the received visible spectrum image in areas corresponding to the player's face, and
blending the sampled colors of the one or more areas to determine a player skin color; and
wherein the generated 3D avatar has a skin color reflecting the determined player skin color.

14. One or more computer hardware devices having a system embodied thereon including computer-executable instructions that, when executed, perform a method for providing query-dependent audio and video clip previews, the system comprising:
a data acquisition component that receives data describing the player's current appearance, the data including: a visible spectrum image of the player, a depth image including both the player and a current background, and skeletal data for the player, the skeletal data indicating an outline of the player's skeleton;
a face capture component that captures a facial appearance of the player based at least in part on the received data, wherein capturing the facial appearance of the player comprises warping a portion of the received visible spectrum image comprising the player's face into a face texture map, wherein the face texture map is a UV space map of the portion of the received visible spectrum image that includes the player's face;
a hair capture component that captures a hair appearance of the player based at least in part on the received data;
a clothing capture component that captures a clothing appearance of the player based at least in part on the received data by:
using the received depth image including both the player and the current background and the received visible spectrum image of the player, determining an outer clothing boundary using edge detection,
using the received visible spectrum image of the player, determining at least one inner clothing boundary by distinguishing clothing from skin based on a determined color gradient, and
identifying player clothing as the area bounded at least in part by the outer clothing boundary and the at least one inner clothing boundary;
an avatar generation component that generates a 3D avatar resembling the player by combining the captured facial appearance, hair appearance, and clothing appearance with predetermined avatar features.

15. The devices of claim 14, further comprising:
a sleeve detection component that identifies, based at least in part on the received data, at least one of: (1) a shirt sleeve, (2) a pants or shorts leg, and (3) a skirt or dress hem;
a skin color capture component that identifies a skin color of the player based at least in part on the received data; and
wherein the avatar generation component combines the identified at least one of: (1) a shirt sleeve, (2) a pants or shorts leg, and (3) a skirt or dress hem and the identified skin color to generate the 3D avatar resembling the player.

16. A computer-implemented method for generating an avatar reflecting a player's current appearance, the method comprising:
receiving data describing the player's current appearance, the data including: a visible spectrum image of the player, a depth image including both the player and a current background, and skeletal data for the player, the skeletal data indicating an outline of the player's skeleton;

capturing a facial appearance of the player based at least in part on the received data by:

identifying the player's face, identifying facial features of the player's face, and warping a portion of the received visible spectrum image that includes the player's face into a face texture map based on the identified facial features, wherein the face texture map is a UV space map of the portion of the received visible spectrum image that includes the player's face;

capturing a hair appearance of the player based at least in part on the received data by:

identifying an extent of the player's hair, matching the identified extent of the player's hair to a predetermined hairstyle template, and identifying a color of the player's hair;

capturing a clothing appearance of the player based at least in part on the received data by:

using the received depth image including both the player and the current background and the received visible spectrum image of the player, determining an outer clothing boundary using edge detection, using the received visible spectrum image of the player, determining at least one inner clothing boundary by distinguishing clothing from skin based on a determined color gradient, and identifying player clothing as the area bounded at least in part by the outer clothing boundary and the at least one inner clothing boundary;

capturing a skin color of the player based at least in part on the received data by:

sampling the color of one or more areas of the received visible spectrum image in areas corresponding to the player's face, and blending the sampled colors of the one or more areas to determine a player skin color; and using a processor of a computing device to generate a 3D avatar reflecting the captured facial appearance, hair appearance, clothing appearance, and skin color of the player such that the 3D avatar resembles the player by combining the face texture map, hairstyle template that matches the identified extent of the player's hair, and identified player hair color with predetermined avatar features.

17. The method of claim 16, wherein capturing the clothing appearance of the player further comprises:

using the received skeletal data, identifying areas corresponding to the arms and legs of the player, and analyzing the color gradient of the received visible spectrum image of the player along the identified areas corresponding to the arms and legs of the player to detect at least one of: (1) shirt sleeve, (2) pants or shorts leg, and (3) skirt or dress hem.

18. The method of claim 16, wherein capturing the clothing appearance of the player further comprises:

using the received skeletal data, identifying areas corresponding to the legs of the player, and using the received depth image including both the player and the current background, analyzing the area between the identified areas corresponding to the legs of the player to detect a skirt or dress edge by distinguishing background depth from player depth and identifying a substantially horizontal edge separating the background depth from the player depth.

19. The method of claim 16, wherein identifying the extent of the player's hair comprises:

using the received depth image including both the player and the current background, determining an outer hair boundary by distinguishing the depth of the background from the depth of the player's hair, using the received visible spectrum image of the player, determining an inner hair boundary by distinguishing the player's skin from both the player's hair and from clothing worn by the player, using the facial features identified in capturing the facial appearance of the player, determining the extent of the player's forehead; and wherein matching the identified extent of the player's hair to a predetermined hairstyle template comprises:

identifying the player's hair as the area bounded at least in part by the outer and inner hair boundaries, identifying a plurality of hair attributes of the player's hair, each of the plurality of hair attributes describing a portion or characteristic of the player's hair, and comparing the identified plurality of hair attributes to a library of predetermined hairstyle templates.

* * * * *